Patented Sept. 2, 1941

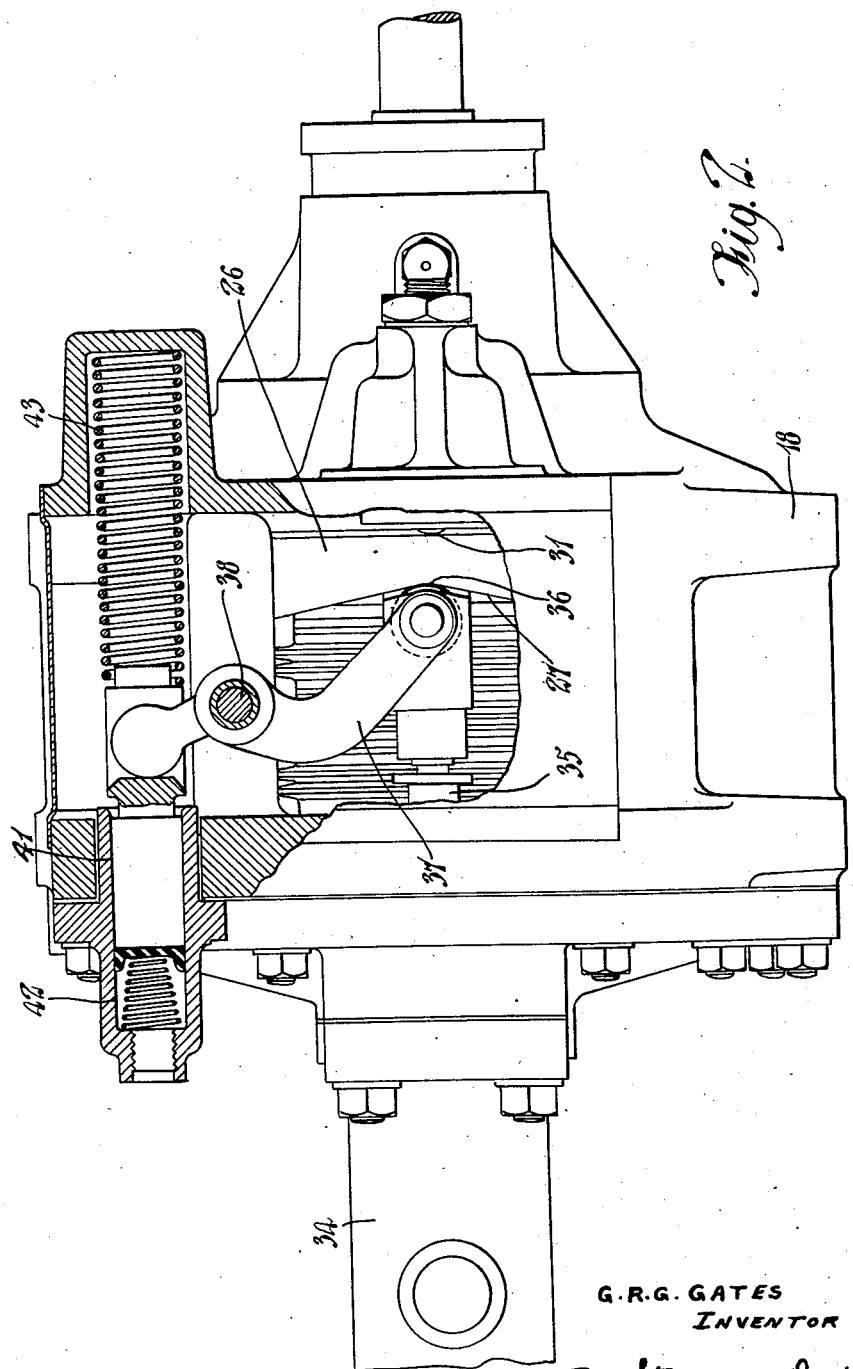

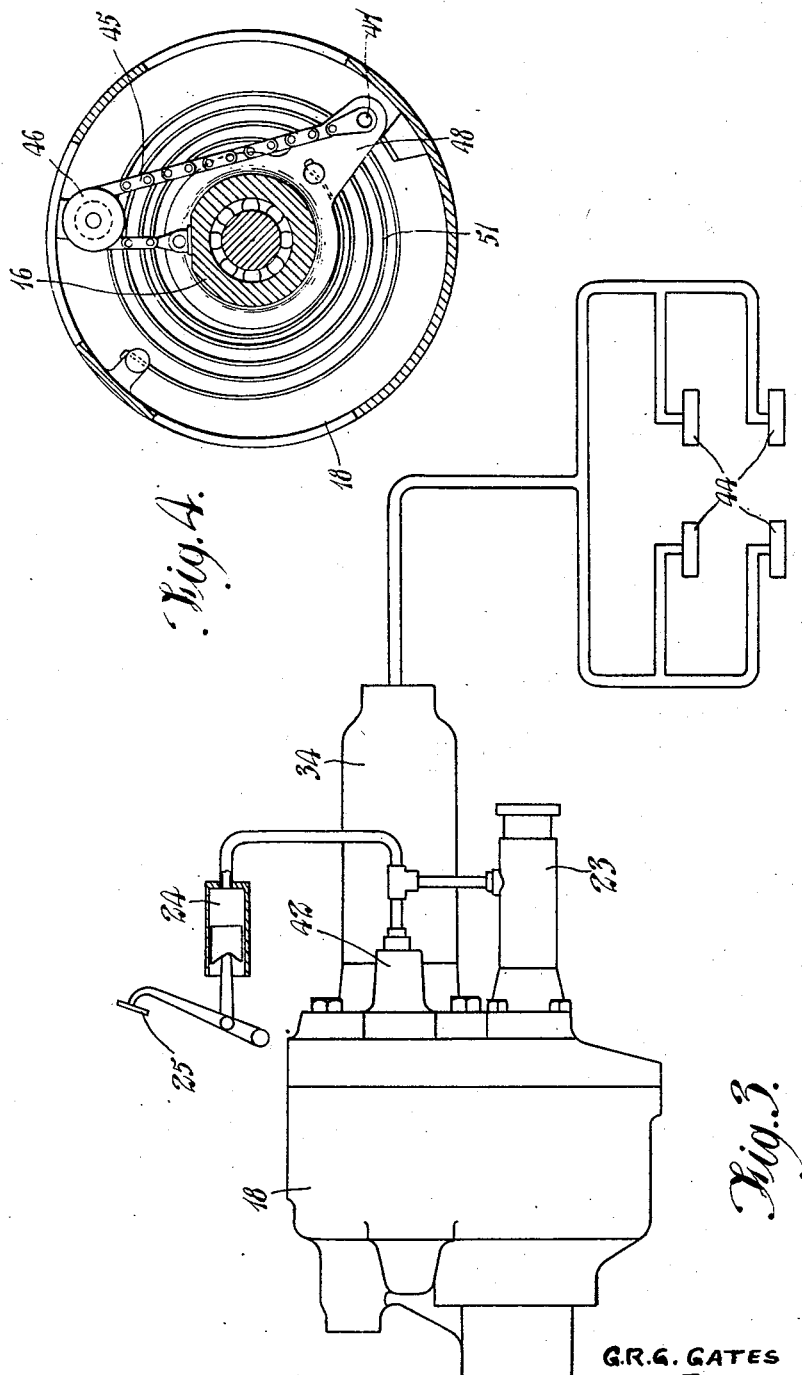

2,254,998

UNITED STATES PATENT OFFICE 2,254,998

SERVO BRAKE MECHANISM FOR VEHICLES

Geoffrey Robert Greenbergh Gates, London, England, assignor of one-half to Automotive Products Company Limited, London, England Application February 7, 1940, Serial No. 317,765
In Great Britain February 20, 1939

6 Claims. (Cl. 188—152)

This invention relates to servo brake mechanism for vehicles, of the type in which energy for operating the brakes is derived from some part of the power transmission system of the vehicle which rotates with the driven road wheels or with the engine, through a torque-applying unit comprising a part (hereinafter referred to as "the driving part") rotating continuously with the power transmission system, and a part (hereinafter referred to as "the driven part") which may be frictionally engaged with the continuously rotating part through the actuation, by the driver of the vehicle or another operator, of a pedal, hand-lever or other control (hereinafter referred to as "the driver's control") to apply a torque to the braking system which is employed to operate the brakes.

The object of the present invention is to provide an improved arrangement for converting the torque applied to the driven part of the torque applying unit into a linear pull or thrust on a brake rod or on a piston of a liquid pressure master cylinder.

According to the invention, the driven part of the torque applying unit carries a symmetrical face cam member, and a brake operating rod carries a follower engaging the cam normally at one point on its axis of symmetry, the arrangement being such that rotary movement of the driven part of the torque applying unit in either direction applies a linear force to the brake operating rod, the force applied to the brake operating rod being always in the same direction.

According to another aspect of the invention, servo brake mechanism for vehicles of the type referred to and comprising a symmetrical cam rotating with the driven part of the torque applying unit, and a brake operating rod carrying a follower which normally engages the cam at one point on its axis of symmetry, is characterised by the feature that the cam is a face cam concentric with the axis of the torque applying unit.

The cam member preferably comprises a cylindrical sleeve having one end face oblique to the axis of the torque applying unit, and the other end face perpendicular to the said axis. The perpendicular face of the cam member may be engaged by a roller pivotally mounted in the housing of the torque applying unit, to transmit the load in the brake rod to the housing and avoid the application of side loads to the bearings of the unit.

The invention is hereinafter described with reference to the accompanying drawings, in which:

Figure 2 is a plan view of the unit shown in Figure 1, parts of the unit being shown in section;

Figure 3 is a diagram of a servo brake system incorporating the invention; and

Figure 4 is a diagram illustrating an alternative method of returning the cam member to its initial position.

Figure 1:
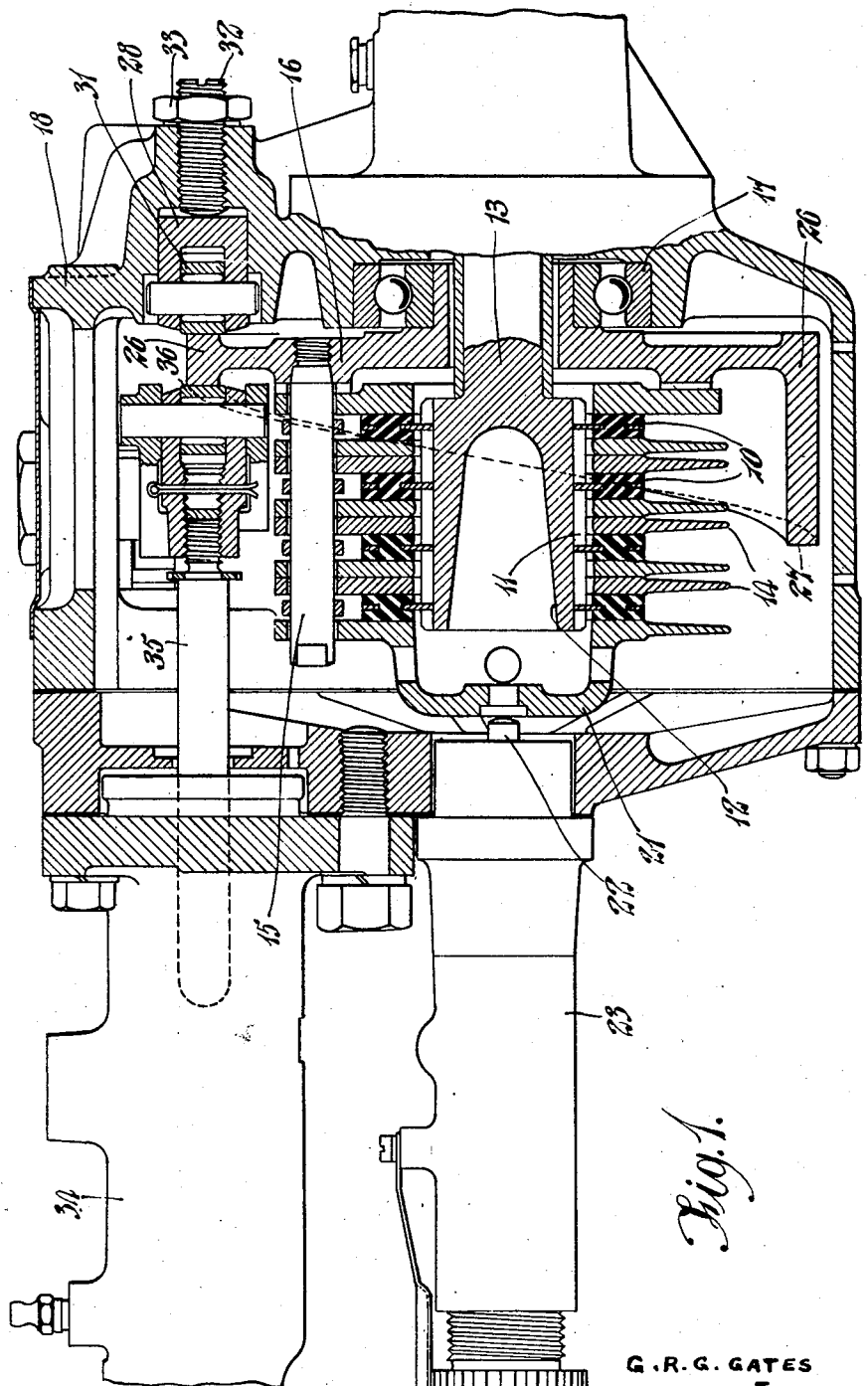
Figure 1 is a vertical section through the torque applying unit of a servo brake mechanism according to the invention.

In the torque applying unit shown in Figures 1 and 2, the driving part comprises a set of discs 10, splined at 11 to the enlarged end 12 of a shaft 13 driven from the gearbox of a motor road vehicle, the discs 10 being arranged in alternate sequence with a second set of discs 14 of larger radius forming the driven part of the unit. The discs 14 are carried by rods 15 arranged parallel with the driving shaft 13 and radially outwards of the periphery of the discs 10, the rods 15 being mounted in an end member 16 itself mounted on a ball thrust bearing 17 in the housing 18. At the opposite end of the pack of discs 10, 14 is a cap member 21 also carried by the rods 15, the cap member 21 receiving the pressure applied to engage the two sets of discs, such pressure being applied by means of a plunger 22 mounted in a cylinder 23 co-axial with the shaft 13, the plunger being moved by liquid pressure generated in a master cylinder 24 (Figure 3) operated by the foot pedal 25 which constitutes the driver's control.

The end member 16 comprises a circular plate of greater radius than the discs 14, and a cylindrical sleeve 26 is formed integrally with the plate about its edge, one end of the sleeve 26 being perpendicular to the driving shaft 13 of the unit, whilst the sleeve is of greater length at one end of a diameter than at the other so that its other end forms a cam surface 27 inclined to the driving shaft 13. A plunger 28 mounted in the housing 18 carries a roller 31 engaging the perpendicular end surface of the cam sleeve 26, the plunger 28 being adjustable by means of a stud 32 and lock-nut 33 to vary the position of the roller. A liquid pressure master cylinder 34 is mounted on the housing 18 at the side of the cam 26 opposite to the roller-carrying plunger 28, the axis of the master cylinder being in line with that of the plunger 28, and a thrust rod 35 engaging the piston of the master cylinder 34 carries at its end a second roller 36 engaging the inclined cam surface 27. To the pivot of the roller 36 on the thrust rod 35 is connected a guiding arm 37, Figure 2, pivoted at 38 in the housing 18, and movable in a plane tangential to the cam sleeve 26 at the point of engagement of the roller 36. The arm 37 constrains the thrust rod 35 to move so that the roller 36 follows an arc of a circle about the pivot 38 of the guiding arm, and cannot move to any substantial degree away from the common axis of the master cylinder 34 and the fixed plunger 28 carrying the supporting roller. The guiding arm 37 is extended beyond its pivot 38 to engage a piston 41 in an auxiliary cylinder 42 carried by the housing 18, the cylinder 42 being in communication with the pedal-operated master cylinder 24. The piston 41 is acted on by a spring 43 tending to urge it into the cylinder 42, and the arm 37 is so arranged that as the thrust rod 35 moves to apply the brakes the arm is moved away from the piston, allowing it to move outwardly under the pressure generated by the master cylinder 24.

When the pedal 25 is depressed by the driver, liquid is forced from the pedal-operated master cylinder 24 into the cylinder 23, and the discs of the torque-applying unit are brought into engagement. The end member 16 carrying the cam sleeve 26 is thus caused to turn, and the roller 36 on the thrust rod 35, which normally engages the lowest point of the cam surface 27, is moved away from the fixed roller 31 as the cam sleeve turns, thus causing substantially linear movement of the rod 35, which in turn moves the piston of the master cylinder 34 mounted on the torque applying unit, to force liquid into wheel cylinders 44 (Figure 3) which spread the shoes of the vehicle brakes. The reaction in the thrust rod 35 is transmitted through the cam sleeve 26 to the fixed roller 31 and there is consequently no side load on the bearings of the torque applying unit.

The control system for the torque applying unit is designed according to the specification of my British Patent No. 477,173 in which the application of the brakes by the unit automatically reduces the engaging pressure on the discs of the unit, the reduction of pressure being carried out in the cylinder 42. The movement of the arm 37 as the brakes are applied allows the piston 41 to move out of the cylinder 42 and increase the volume of the cylinder, so that for a given degree of depression of the brake pedal 25 the pressure engaging the discs is decreased when the brakes are operated until a state of balance is set up, thus ensuring that the brakes are always under full control of the operator.

When the brakes are to be released, the operator releases the pedal 25 and relieves the pressure on the discs of the torque-applying unit, thus allowing the cam sleeve 26 to be returned to its initial position and allowing the master cylinder piston to return and permit the return of liquid from the wheel cylinders 44. The pull-off springs in the brakes, acting through the column of liquid, and the customary return spring in the master cylinder itself, together produce a load tending to return the piston. By arranging the cam sleeve so that in its initial position the axis of symmetry of the cam surface 27 is vertical, and the deepest part of the sleeve 26 is at the bottom, it is given a natural tendency to return to that position under the force of gravity. This tendency assisted by the return force on the master cylinder piston returns the cam to its initial position. Alternatively, the cam sleeve may be brought back to its initial position by spring means, as shown in Figure 4 for example, a chain 45 being attached at one end to the end member 16, and passing over a pulley 46 to an anchorage 47 on a plate 48 rotatably mounted in the housing 18 and having secured to it one end of a clock spring 51, the other end of which is anchored to the housing itself. The spring 51 tends to rotate the plate 48 and apply a pull to the chain 45, which thus tends to take up a position in which the part between the end member 16 and the pulley 46 extends radially. The cam sleeve and end member are thus always returned to this position by the spring 51.

By the present invention there is provided a torque applying unit for a servo brake mechanism which is very compact and simple to manufacture, and in which no side loads are borne by the bearings of the unit.

What I claim is:

1. Servo brake mechanism for vehicles comprising a shaft rotating with the driven road wheels of the vehicle, a rotatable disc, disconnectible friction coupling means between the shaft and the disc, a symmetrical face cam formed on one face of the disc, brakes on said vehicle, a brake operating rod coupled to said brakes, a follower on said brake operating rod engaging the face cam whereby movement of the rod to apply the brakes is produced when the friction coupling means are engaged, a circumferential track on the opposite face of the disc, said track being of substantially equal diameter to the face cam and lying in a plane perpendicular to the axis of the disc, and a roller mounted on fixed bearings and engaging the circumferential track, the cam follower and roller engaging the face cam and circumferential track respectively at points substantially on a common radius of the disc, whereby the disc is supported by the roller against the reaction in the brake operating rod.

2. Servo brake mechanism for vehicles comprising a shaft rotating with the driven road wheels of the vehicle, a rotatable sleeve mounted with its axis horizontal and having one end oblique to the axis of the sleeve to form a symmetrical face cam, and the other end perpendicular to said axis, disconnectible friction coupling means between the shaft and the sleeve, brakes on the vehicle, a brake operating rod coupled to said brakes, a follower on said brake operating rod engaging the face cam vertically above the axis of the sleeve, whereby movement of the rod to apply the brakes is produced when the friction coupling means are engaged, and a roller mounted in fixed bearings and engaging the perpendicular end of the sleeve in the same radial plane as the cam follower to support the sleeve against the reaction in the brake operating rod, whereby the action of gravity on the sleeve tending to maintain the deepest part thereof at the bottom acts to return said mechanism to the inoperative position.

3. Servo brake mechanism for vehicles comprising a shaft rotating with the driven road wheels of the vehicle, a rotatable disc, disconnectible friction coupling means between the shaft and the disc, a symmetrical face cam formed on one face of the disc, brakes on said vehicle, a brake operating rod coupled to said brakes, a follower on said brake operating rod engaging the face cam whereby movement of the rod to apply the brakes is produced when the friction coupling means are engaged, a chain attached to said disc, a spring coupled to the other end of the chain, a pulley mounted in fixed bearings over which the chain passes whereby the spring acts to return the disc to a position in which that end of the chain adjacent its attachment to the disc extends radially outwardly, a circumferential track on the opposite face of the disc, said track being of substantially equal diameter to the face cam and lying in a plane perpendicular to the axis of the disc, and a roller mounted in fixed bearings and engaging the circumferential track, the cam follower and roller engaging the face cam and circumferential track respectively at points substantially on a common radius of the disc, whereby the disc is supported by the roller against the reaction in the brake operating rod.

4. Servo brake mechanism for vehicles comprising a shaft rotating with the driven road wheels of the vehicle, a rotatable disc, disconnectible friction coupling means between the shaft and the disc, a symmetrical face cam formed on one face of the disc, brakes on said vehicle, fluid pressure operating means for said brakes including a master cylinder, an operating rod for said master cylinder, a follower on said operating rod engaging the face cam whereby movement of the rod to create pressure in the master cylinder is produced when the friction coupling means are engaged, a circumferential track on the opposite face of the disc, said track being of substantially equal diameter to the face cam and lying in a plane perpendicular to the axis of the disc, and a roller mounted in fixed bearings and engaging the circumferential track, the cam follower and roller engaging the face cam and circumferential track respectively at points substantially on a common radius of the disc, whereby the disc is supported by the roller against the reaction in the brake operating rod.

5. Servo brake mechanism for vehicles comprising a shaft rotating with the driven road wheels of the vehicle, a rotatable sleeve mounted with its axis horizontal and having one end oblique to the axis of the sleeve to form a symmetrical face cam, and the other end perpendicular to said axis, disconnectible friction coupling means between the shaft and the sleeve, brakes on the vehicle, fluid pressure operating means for said brakes including a master cylinder, an operating rod for said master cylinder, a follower on said operating rod engaging the face cam whereby movement of the rod to create pressure in the master cylinder is produced when the friction coupling means are engaged, and a roller mounted in fixed bearings and engaging the perpendicular end of the sleeve in the same radial plane as the cam follower to support the sleeve against the reaction in the brake operating rod, whereby the action of gravity on the sleeve tending to maintain the deepest part thereof at the bottom acts to return said mechanism to the inoperative position.

6. Servo brake mechanism for vehicles comprising a shaft rotating with the driven road wheels of the vehicle, a rotatable disc, disconnectible friction coupling means between the shaft and the disc, a symmetrical face cam formed on one face of the disc, brakes on said vehicle, a brake operating rod coupled to said brakes, a follower on said brake operating rod engaging the face cam whereby movement of the rod to apply the brakes is produced when the friction coupling means are engaged, an arm pivotally connected to the brake operating rod adjacent the cam follower, and lying in a plane substantially tangential to the cam member at the point of engagement of the follower, a fixed pivot for the arm, a liquid pressure master cylinder, a driver's control for operating said master cylinder, a motor cylinder connected to said master cylinder and controlling the friction coupling means, a compensating cylinder, and a piston in the compensating cylinder engaged by the arm, the arrangement being such that the movement of said arm as the brakes are applied permits the piston to move outwardly in the compensating cylinder and increase the space in the cylinder, thereby decreasing the pressure acting to maintain the friction coupling means in engagement.

GEOFFREY ROBERT GREENBERGH GATES.